(12) United States Patent
Thomsen et al.

(10) Patent No.: US 7,041,361 B2
(45) Date of Patent: May 9, 2006

(54) WEB WITH SEALED POCKETS

(76) Inventors: Peter Neils Thomsen, 21 Wybalena Road, Hunters Hill, New South Wales 2110 (AU); Patrick Joseph Byrne, 8 Thomas Road, Galston, New South Wales 2159 (AU)

( * ) Notice: Subject to any disclaimer, the term of this patent is extended or adjusted under 35 U.S.C. 154(b) by 0 days.

(21) Appl. No.: 10/380,448

(22) PCT Filed: Sep. 12, 2001

(86) PCT No.: PCT/AU01/01167

§ 371 (c)(1),
(2), (4) Date: Jul. 15, 2003

(87) PCT Pub. No.: WO02/22351

PCT Pub. Date: Mar. 21, 2002

(65) Prior Publication Data

US 2004/0048045 A1    Mar. 11, 2004

(30) Foreign Application Priority Data

Sep. 12, 2000    (AU) ..................... PR0162

(51) Int. Cl.
*B32B 1/00*    (2006.01)
*B32B 3/00*    (2006.01)
(52) U.S. Cl. .................. 428/178; 428/72; 428/166
(58) Field of Classification Search .............. 428/68, 428/70, 72, 75, 76, 34, 166, 178, 188, 913
See application file for complete search history.

(56) References Cited

U.S. PATENT DOCUMENTS

| | | | | |
|---|---|---|---|---|
| 3,294,387 A | * | 12/1966 | Chavannes | ................. 267/145 |
| 3,577,305 A | * | 5/1971 | Hines et al. | .................. 428/72 |
| 4,535,828 A | * | 8/1985 | Brockhaus | ............... 160/84.04 |
| 4,576,669 A | | 3/1986 | Caputo | |
| 5,374,468 A | * | 12/1994 | Babinsky et al. | ........... 428/172 |
| 5,470,641 A | * | 11/1995 | Shuert | ........................ 428/178 |
| 5,849,394 A | | 12/1998 | Bussey, III et al. | |
| 6,139,188 A | | 10/2000 | Marzano | |

FOREIGN PATENT DOCUMENTS

| | | |
|---|---|---|
| CA | 2041376 A1 | 11/1991 |
| EP | 0415415 B1 | 11/1996 |
| EP | 0857563 A1 | 6/1998 |
| WO | WO 89/00919 | 2/1989 |
| WO | WO 00/47400 | 8/2000 |

OTHER PUBLICATIONS

International Search Report for PCT/AU01/01167, date mailed Nov. 22, 2001.
International Preliminary Examination Report for PCT/AU01/01167, date mailed Aug. 12, 2002.

* cited by examiner

*Primary Examiner*—Donald J. Loney
(74) *Attorney, Agent, or Firm*—Abelman, Frayne & Schwab

(57) ABSTRACT

A web is formed from two sheets of polymeric material. An upper sheet includes pockets of any form. A lower sheet is subsequently bonded to the upper sheet which causes the sealing of each of the pockets. A web thus formed may be laminated with a metallic foil or metallized polymeric film. Such a web may also be laminated with a similar web in a face to face relationship so that the pockets interdigitate.

11 Claims, 1 Drawing Sheet

WEB WITH SEALED POCKETS

BACKGROUND OF THE INVENTION

1. Field of the Invention

This invention pertains to webs or sheets that include sealed pockets. More particularly, the invention pertains to laminates formed from such webs.

2. Description of the Related Art

International Patent Application No. PCT/AU98/00494 (International Publication No. WO99/00161) discloses a protector pad which is formed from a web which is fabricated to include a number of sealed bubbles which provide a shock absorbing effect. That document is incorporated herewith by reference.

BRIEF SUMMARY OF THE INVENTION

The present invention proposes certain improvements which allow the invention to be employed in new fields and in new ways.

Accordingly, there is provided a web, comprising: two sheets of polymeric material, with a first sheet having an array of pockets formed into it, and a second sheet bonded to the first sheet so as to seal the pockets.

In another embodiment of the invention, a laminate is formed from two webs, each comprising overlying sheets of flexible material sealed together with a plurality of spaced apart, non-connected, air-filled pockets. Each web further comprises a flat side and a pocketed side. The pocketed sides of each web are joined, interdigitated or tessellated to form a laminate having two flat sides.

In other embodiments of the invention, the laminate formed by joining the two webs is laminated with a metallic foil or metallized polymeric film.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 1:
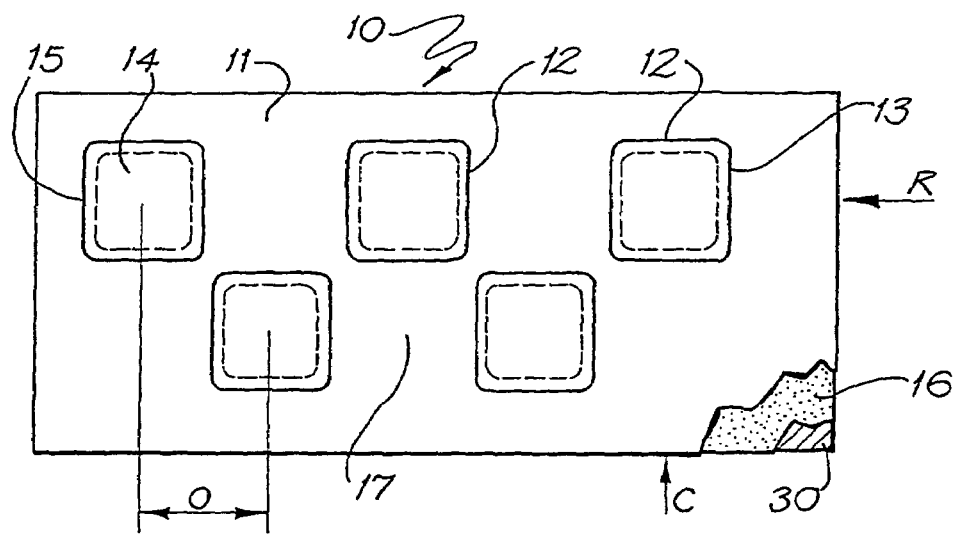
FIG. 1 is a plan view of one embodiment of a web formed in accordance with the teachings of the present invention.

As shown in FIG. 1, a web 10 is formed from two sheets of polymer material. An upper sheet 11 includes vacuum-formed pockets 12. The pockets 12 may take any shape and are shown as being square for the purposes of the present example. Accordingly, the perimeter 13 of each pocket may take practically any form. The upper surface 14 and perimeter walls 15 of each pocket are integrally formed by a vacuum or other molding process into the upper sheet 11. The upper sheet 11 is subsequently bonded to a lower sheet 16, which operation causes the sealing of each of the pockets 12. With reference to FIG. 1 it can be seen that the pockets 12 form a regular two-dimensional array which may be conveniently viewed as having any number of rows R and columns C. Pockets 12 in any row or column have the same spacing, but adjacent rows R (or columns C, or both) are offset by an amount O so as to form a regular array of pockets 12 and gaps 17.

In preferred embodiments of the invention, a gap 17 is formed between adjacent pockets 12. The gap 17 is large enough to accommodate a pocket 12.

Figure 2:
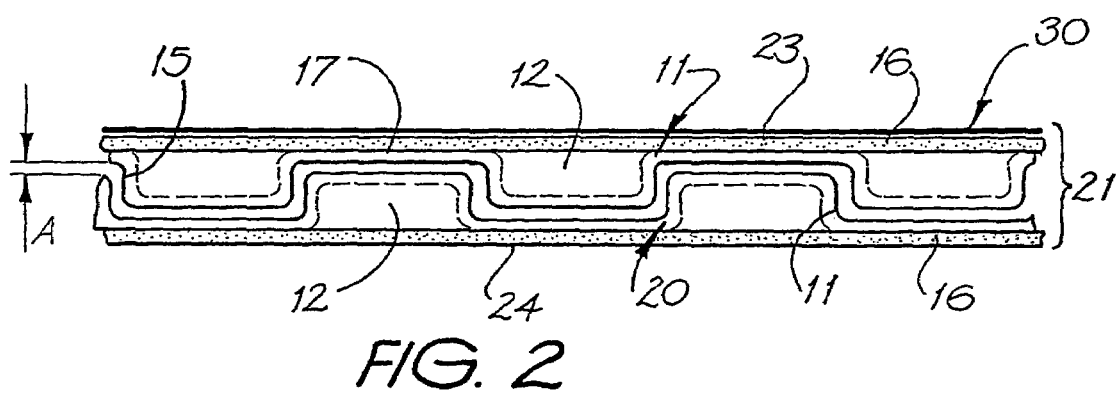
FIG. 2 is an end view of one embodiment of a laminate formed in accordance with the teachings of the present invention.

As shown in FIG. 2, two webs 11, 20 may be assembled and optionally joined to form a laminate 21. Owing to the arrangement of the webs 11 disclosed with reference to FIG. 1, the pockets 12 face one another, interdigitate or tessellate to form a compact structure. As shown in FIG. 2 and with respect to a row of pockets 12, pockets of the top layer are seen as alternating with pockets of the bottom layer. The webs 11, 20 may be sealed together, or not.

Figure 3:
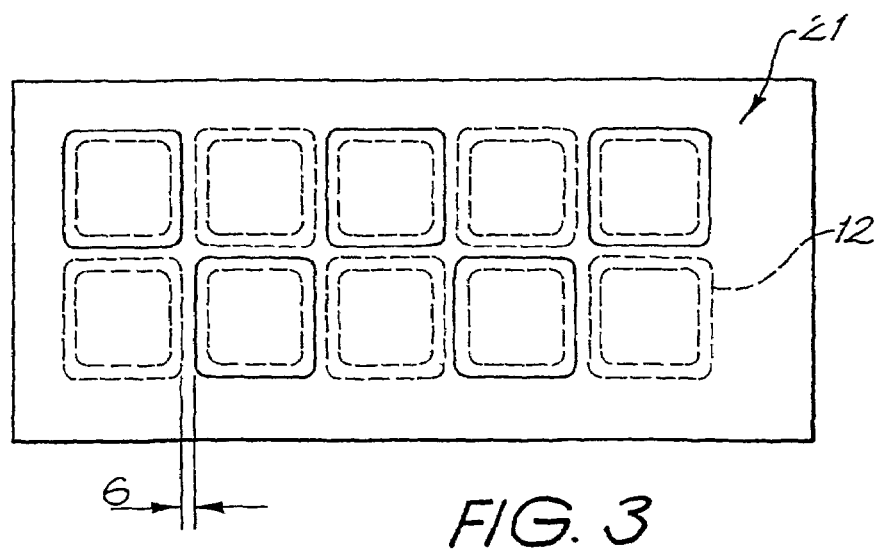
FIG. 3 is a schematic top plan view illustrating the arrangement of pockets in the laminate of FIG. 2.

FIG. 3 illustrates a laminate 21 with internal pockets 12 of the variety depicted in FIG. 2. It will be appreciated that the array of pockets is shown as relatively closely packed with only small gaps G between any two adjacent pockets 12. It will appreciated that the size and spacing of the pockets may be altered to achieve different packing densities, laminate stiffness, impact or sound absorbing qualities. Neither the gaps 17, nor the pockets 12 need all be the same size so long as the pockets interdigitate or tessellate to form a compact structure with parallel outside surfaces 23, 24.

Another embodiment of the invention is suggested in FIGS. 1 and 2. In this embodiment, the outside surface of one web 23 or both 23, 24 are provided with enhanced properties by further lamination with a metallic foil or metallized polymeric film 30. The application of, for example, an aluminum foil or aluminum powder coated polyester film 30 provides improved insulation and provides for the reflection of radiant heat energy.

The structures of the present invention have a wide variety of uses. Single webs of the type depicted in FIG. 1 may be used for vibration isolation, impact protection and as noise insulation. A web of this type further laminated with the metal foil or film 30 serves as a better thermal insulator. Webs which are laminated together 21, as shown in FIG. 2, may be used as sound or noise insulation and may be engineered with a fixed, predetermined gap A between webs which optimizes noise abatement and particular frequencies or otherwise provides for better insulation. The gap A may be filled with a foam or gas (air or other gas) or liquid.

While the present invention has been disclosed with reference to particular details of construction, these should be understood as having been provided by way of example and not as limitations to the scope or spirit of the invention. In particular, the dimension, shape and depth of the pockets is not considered essential to the utility of the invention. Similarly, the materials of construction and the precise methods of lamination are not considered essential.

What is claimed is:

1. A composite material comprising:
   a first web and a second web, wherein each of the first and second webs includes, respectively, a first sheet and a second sheet, with the first sheet of each web being composed of polymeric material, the first sheet having an array of similar air-filled closed pockets formed into the first sheet with adjacent pockets being spaced apart from one another enough to accommodate a similar pocket;
   wherein each second sheet of each web is bonded to the first sheet of the respective web so as to seal the pockets of each respective first sheet;
   wherein the first and second webs are assembled to form a composite structure with the pockets of each web facing one another and interdigitating;

wherein the first and second webs are spaced apart by a gap of fixed dimension; and wherein the gap is filled with a substance selected from: foam, liquid, air, or gas other than air.

2. The composite material of claim 1 wherein the pockets of each web tessellate.

3. The composite material of claim 1 wherein the pockets of both webs form a compact structure.

4. The composite material of claim 1 wherein the first and second webs are joined together.

5. The composite material according to claim 1 wherein a metallic foil is bonded to an outside surface of the second sheet of the first web.

6. The composite material according to claim 1 wherein the pockets of each web are arranged in an array of rows and columns, and adjacent rows or columns are offset with respect to one another.

7. A composite material comprising:

a first web and a second web, wherein each of the first and second webs includes, respectively, a first sheet and a second sheet, with the first sheet of each web being composed of polymeric material, the first sheet having an array of similar air-filled closed pockets formed into the first sheet with adjacent pockets being spaced apart from one another enough to accommodate a similar pocket, with a metallic material bonded to an outside surface of the second sheet of the first web; and wherein the first and second webs are assembled to form a composite structure with the pockets of each web facing one another and interdigitating, with the first and second webs being spaced apart by a gap of fixed dimension, wherein the gap is filled with a substance selected from: foam, liquid, air, or gas other than air.

8. The composite material of claim 7 wherein the metallic material is a metallic foil.

9. The composite material of claim 7 wherein the metallic material is a metallized polymeric film.

10. The composite material of claim 7 wherein the first and second webs are joined together.

11. The composite material of claim 7 wherein the pockets of both webs form a compact structure.

* * * * *